Nov. 19, 1940.  E. OJALVO  2,221,992

LOCK

Filed April 22, 1940

INVENTOR.
EDMOND OJALVO.
BY
ATTORNEY.

Patented Nov. 19, 1940

2,221,992

UNITED STATES PATENT OFFICE 2,221,992

LOCK

Edmond Ojalvo, New York, N. Y.

Application April 22, 1940, Serial No. 330,866

6 Claims. (Cl. 200—43)

This invention relates to locks, and particularly although not exclusively to locks associated with automobile ignition systems.

It is primarily within the contemplation of my invention to provide a lock having two separate manually operable elements requiring, under certain conditions, two independent operative manipulations to effectuate an operative unlocking of the device with which it is associated. And in the application of my invention to an automobile, it is an important objective to employ a conventional combination lock in conjunction with an arrangement of walls associated with the instrument panel so as to provide at least one concealed compartment, in which one of said two locking elements is disposed, said compartment being accessible only through the aforesaid combination lock.

It is another object of this invention, particularly when applied to an automobile, to provide a conveniently located door on the instrument panel serving as a closure not only for the concealed locking element above-mentioned, but also for an adjacent compartment for storing valuables and the like.

And in a further application of my invention to an automobile, it is another object to combine the aforesaid two locking elements in the ignition circuit in such manner that one of said elements will be at all times exposed and readily accessible, and the other concealed as aforesaid, whereby the circuit can be opened and closed either by a manipulation of the exposed locking element alone if so desired,—or if the car is to be left alone, by manipulations of both the exposed and concealed locking elements, in order to start the car.

Other objects, features and advantages will appear from the drawing and description hereinafter given.

Referring to the drawing.

Figure 1:
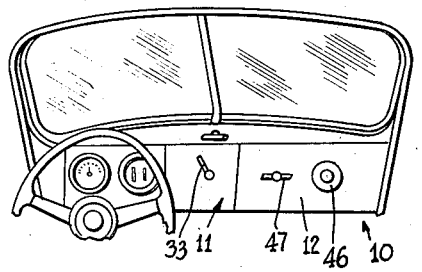
Figure 1 is a partial front view of an instrument panel on an automobile containing my invention.
Figure 2:
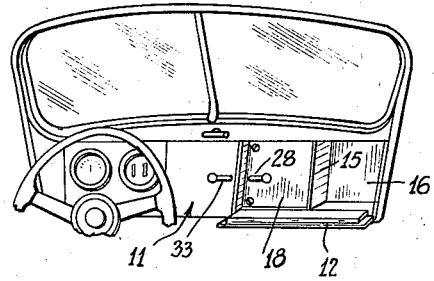
Figure 2 is a view similar to Figure 1, with the compartment door swung open to expose the concealed locking element and the adjacent compartment.
Figure 4:
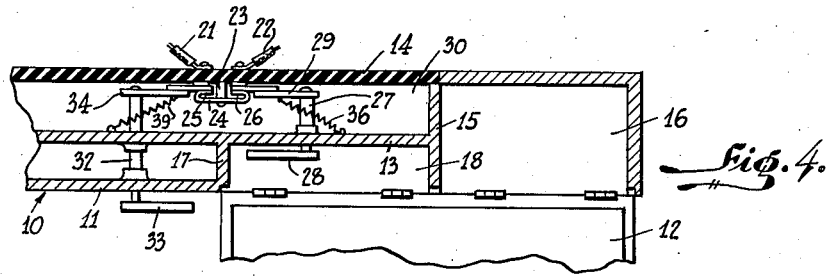
Figure 4 is a fragmentary section taken substantially along line 4—4 of Figure 3.

In the drawing, the instrument panel 10 comprises the front wall 11 containing the door 12 hingedly mounted preferably at the bottom edge thereof and adapted to swing open downwardly to the position shown in Figure 2. Spaced rearwardly from front wall 11 is the intermediate wall 13, and spaced rearwardly from said latter wall is the rear wall 14. In the preferred arrangement of my invention, there is a partition wall 15 connecting the front and rear walls and forming a compartment 16 for valuables and the like; and there is also an intermediate compartment wall 17 cooperating with walls 11, 13, and 15 to form a concealed lock compartment 18.

Suitably mounted upon the inner surface of rear wall 14, which is of insulating material, are the two stationary contacts 19 and 20 electrically connected to conductors 21 and 22 in the ignition circuit. Secured to wall 14 by support 23, preferably disposed between the contacts 19 and 20, is the double switch member 24 preferably of spring material the opposite terminals of which are bent back to form two contacts 25 and 26 in spaced relation to and adapted to cooperate with the aforesaid contacts 19 and 20, respectively. In the preferred form of my invention, the contact terminals 25 and 26 are normally slightly inclined towards their corresponding contacts 19 and 20, as clearly indicated in Figure 7, to effect a firm contact with the coacting contact blades as will hereinafter appear.

The intermediate wall 13 supports the shaft 27 the forward portion of which is connected to the hand operable lever 28 and the rear portion to the insulating bar 29,—the lever 28 being in compartment 18 and the bar 29 in compartment 30. Suitably secured to said bar 29 is the contact blade 31 adapted, when in its operable position, to extend between and be in engagement with coacting stationary contacts 20 and 26. Suitably supported by fron wall 11 and intermediate wall 13 is the shaft 32, the forward portion of which is connected to the lever 33 extending in front of wall 11, and the rear portion of which is connected to the insulating bar 34 in compartment 30. Secured to insulating bar 34 is the contact blade 35 which is engageable with the contacts 19 and 25 when in its closed position. It will be observed that the blades 31 and 35 are adapted to be in pressing engagement with their corresponding stationary contacts, in view of the inclination of resilient contacts 25 and 26.

Suitably secured to the intermediate wall 13 is the spring 36, said spring being anchored to the wall at point 37 which is on that side of shaft 27 remote from switch member 24. The other end of spring 36 is secured to the insulating bar 29 at point 38 between shaft 27 and contact 26. Suitably secured to the opposite portion of intermediate wall 13 is the spring 39 anchored at point 40 which is on that side of shaft 32 remote from switch member 24. The other end of spring 39 is secured to the insulating bar 34 at point 41 between shaft 32 and contact 25.

Figures 5, 6:
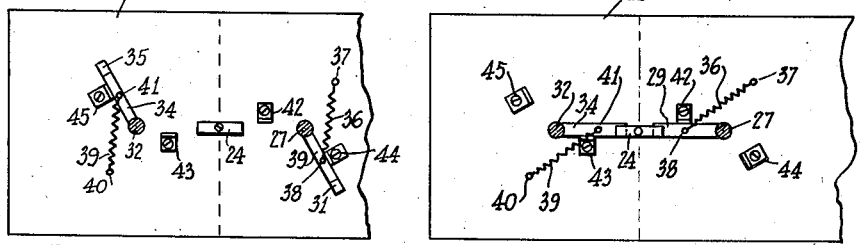
Figure 5 is a fragmentary front view showing in semi-diagrammatic form the arrangement of the contact levers in open inoperative positions.
Figure 6 is a view similar to Figure 5, showing the position of the contact levers when the ignition circuit is fully closed.

The arrangement of said springs and contact elements is such that when the blades are in their closed positions, as indicated in Figure 6, the springs 36 and 39 will yieldably hold the bars 29 and 34 against stops 42 and 43 respectively,— these stops being so arranged as to limit the movement of the blades to such positions that they will preferably be in alignment when they are in engagement with the contacts 20, 26, and 19, 25, respectively. When the blades 31 and 35 are urged into their disconnected or open positions, the springs 36 and 39 will urge the bars 29 and 34 against stops 44 and 45, respectively, as clearly indicated in Figure 5.

Figure 3:
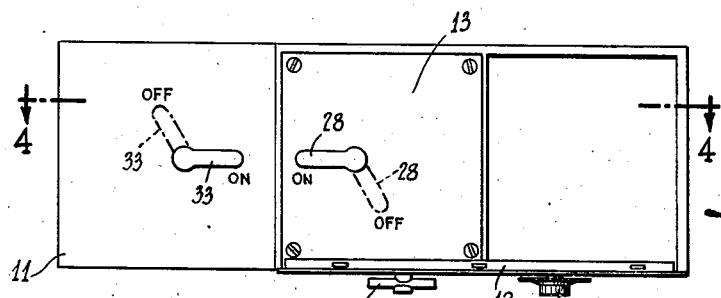
Figure 3 is an enlarged front view of the instrument board showing the front door open with the locking elements arranged so that the circuit is closed.

Under normal driving conditions the blades 31 and 35 are in their contacting positions as indicated in Figure 6,—the manually operable levers 28 and 33 being substantially in the positions indicated in Figure 3. At such time, the door 12 is normally closed and maintained in locked position by the combination dial 46. Should it be desired to stop the car, all that need be done is to turn lever 33 into the dot-dash position shown in Figure 3, whereupon the blade 35 will be taken out of engagement with the coacting contacts 19 and 25 to open the circuit. In this manner the car can be started or stopped, merely by manipulating lever 33.

Figures 7, 8:
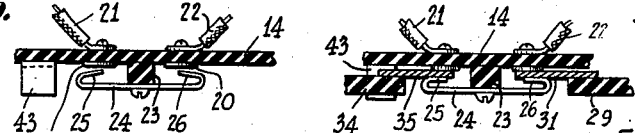
Figure 7 is an enlarged fragmentary section, substantially along line 4—4 of Figure 3, showing the rear wall and the stationary portion of the double switch when the circuit is open.
Figure 8 is a view substantially similar to Figure 7, showing the position of the switch parts when the circuit is closed.

However, should it be desired to leave the car unattended, the combination dial 46 is operatively manipulated and the handle 47 is rotated to open the door 12, to gain access to the concealed lever 28. This lever is then rotated substantially to the dot-dash position shown in Figure 3, whereupon the blade 31 will be moved out of engagement with the coacting contacts 20 and 26. Thereafter the door 12 is locked and the lever 33 moved to the dot-dash position indicated. The circuit will now be open in two places, as indicated in Figures 5 and 7. Should an attempt be made to start the car by manipulating lever 33 to close blade 35, the gap at terminals 20 and 26 will prevent a starting of the car. And to gain access to the interior of concealed compartment 18 will require a knowledge of the combination of lock 46.

The owner of the car, upon his return, can very readily start the car by opening the door 12 after properly manipulating combination 46, and closing the double switch 24 by turning levers 28 and 33 to the positions indicated in Figure 3. It is of course understood that instead of levers 28 and 33, conventional key operated locks can be employed, within the purport and intent of my invention.

It should be noted that the arrangement of walls and compartments is such as to be economical of space, requiring no bulky or obstructing additions. The compartments formed by the walls, such as compartments 16 and 18, can obviously very readily be utilized for the safekeeping of valuables when the door 12 is locked.

An important function of this device may be found in the fact that persons in unfit conditions to drive will be unable to start the motor inasmuch as it would require at least a normal degree of concentration to operate even a simple combination lock. Hence my invention is adaptable not only as a means of preventing the theft of an unattended car, but also as a means of preventing one not in full possession of his faculties, as an inebriated person, from starting the automobile.

It is of course understood that the embodiments above-described and shown in the drawing are illustrative of my invention and not employed by way of limitation, inasmuch as numerous changes and modifications may be made within the scope of the appended claims without departing from the spirit of this invention.

What I claim is:

1. In a lock of the class described, an insulating wall, a switch associated with the wall and containing a metal bar of resilient material having the opposite terminals bent back to form yieldable contacts, an insulating support associated with the wall and in supporting engagement with said bar at substantially the medial portion thereof for maintaining said yieldable contacts in spaced relation to the wall, a contact affixed to the wall adjacent each of said yieldable contacts and adapted to coact therewith, two independent switch blades rotatably mounted on opposite sides of said support and each being movable between an open position remote from one pair of coacting contacts and its closed position between and in engagement with said contacts, yieldable means associated with said blades for holding the blades in their respective open and closed positions, manually operable means associated with said blades for operatively moving them in and out of their contacting positions against the action of said yieldable means, and electric conductors connected to the said contacts mounted on the wall.

2. In an automobile ignition locking system, a front wall substantially in the plane of the instrument panel, an intermediate wall spaced rearwardly therefrom, a rear wall containing an insulated portion spaced rearwardly from the intermediate wall, a switch associated with said rear wall and containing two pairs of coacting contacts, each pair comprising one contact mounted on said insulated portion and another contact spaced therefrom, the two contacts spaced from the wall being electrically connected together, two independent switch blades rotatably supported by said intermediate wall and disposed between the intermediate and rear walls, said blades each being movable between and engageable with a pair of coacting contacts, manually operable means associated with said blades for operatively moving them in and out of their contacting positions, and electric conductors connected to the said contacts mounted on the rear wall.

3. In an automobile ignition locking system, a front wall substantially in the plane of the instrument panel, an intermediate wall spaced rearwardly therefrom, a rear wall containing an insulated portion spaced rearwardly from the intermediate wall, a switch associated with said rear wall and containing two pairs of coacting contacts, each pair comprising one contact mounted on said insulated portion and another contact spaced therefrom, the two contacts spaced from the wall being electrically connected together, two independent switch blades rotatably supported by said intermediate wall and disposed between the intermediate and rear walls, said blades each being movable between and engageable with a pair of coacting contacts, a manually operable member associated with each of said blades for operatively moving them in and out of their respective contacting positions, one of said members being adjacent said intermediate wall, and the other of said members being adjacent the front wall, and electric conductors connected to the said contacts mounted on the rear wall.

4. In an automobile ignition locking system, a front wall substantially in the plane of the instrument panel, an intermediate wall spaced rearwardly therefrom, a rear wall containing an insulated portion spaced rearwardly from the intermediate wall, a switch associated with said rear wall and containing two pairs of coacting contacts, each pair comprising one contact mounted on said insulated portion and another contact spaced therefrom, the two contacts spaced from the wall being electrically connected together, two independent switch blades each being movable between and engageable with a pair of coacting contacts, a shaft attached to each of said blades and insulated therefrom, one of said shafts being relatively short and being rotatably supported by the intermediate wall, the other of said shafts being rotatably supported by both the intermediate and front walls, a manually operable member associated with the forward portions of each of said shafts for rotatably moving the blades in and out of their respective contacting positions, and electric conductors connected to the said contacts mounted on the rear wall.

5. In an automobile ignition locking system, a front wall substantially in the plane of the instrument panel, an intermediate wall spaced rearwardly therefrom, a rear wall containing an insulated portion spaced rearwardly from the intermediate wall, a switch associated with said rear wall and containing two pairs of coacting contacts, each pair comprising one contact mounted on said insulated portion and another contact spaced therefrom, the two contacts spaced from the wall being electrically connected together, two independent switch blades each being movable between an open position remote from one pair of coacting contacts and its closed position between and in engagement with said contacts, spring means mounted on said intermediate wall and associated with said blades for holding them in their respective open and closed positions, a shaft attached to each of said blades and insulated therefrom, one of said shafts being relatively short and being rotatably supported by the intermediate wall, the other of said shafts being rotatably supported by both the intermediate and front walls, a manually operable member associated with the forward portions of each of said shafts for rotatably moving the blades in and out of their respective contacting positions, and electric conductors connected to the said contacts mounted on the rear wall.

6. In an automobile ignition locking system, a front wall substantially in the plane of the instrument panel, an intermediate wall spaced rearwardly therefrom, a rear wall containing an insulated portion spaced rearwardly from the intermediate wall, a partition wall extending rearwardly substantially from the plane of the front wall and joining the intermediate and rear walls, a second partition wall extending from the front to the intermediate wall, a door substantially in the plane of the front wall and coacting with said partition walls and the intermediate wall to form a closed compartment when the door is closed, a switch associated with said rear wall and containing two pairs of coacting contacts, each pair comprising one contact mounted on said insulated portion and another contact spaced therefrom, the two contacts spaced from the wall being electrically connected together, two independent switch blades each being movable between and engageable with a pair of coacting contacts, a shaft attached to each of said blades and insulated therefrom, one of said shafts being relatively short and being rotatably supported by the intermediate wall, the other of said shafts being rotatably supported by both the intermediate and front walls, a manually operable member associated with the forward portions of each of said shafts for rotatably moving the blades in and out of their respective contacting positions, the member associated with the short shaft being disposed within said compartment, the other member being disposed in front of the front wall, and electric conductors connected to the said contacts mounted on the rear wall.

EDMOND OJALVO.